United States Patent [19]

Cusack

[11] Patent Number: 4,543,859
[45] Date of Patent: Oct. 1, 1985

[54] PROBE ADJUSTMENT TOOL AND METHOD OF USING SAME

[75] Inventor: Robert F. Cusack, Grosse Pointe, Mich.

[73] Assignee: GTE Valeron Corporation, Troy, Mich.

[21] Appl. No.: 671,860

[22] Filed: Nov. 15, 1984

Related U.S. Application Data

[60] Division of Ser. No. 504,149, Jun. 14, 1983, Pat. No. 4,510,693, which is a continuation-in-part of Ser. No. 388,187, Jun. 14, 1982, Pat. No. 4,451,987.

[51] Int. Cl.[4] ............................................. B25B 15/00
[52] U.S. Cl. ...................................................... 81/484
[58] Field of Search ...................... 81/90 C, 57.39, 3 R

[56] References Cited

U.S. PATENT DOCUMENTS

| | | | |
|---|---|---|---|
| 4,092,881 | 6/1978 | Jurgens et al. | 81/57.39 |
| 4,118,871 | 10/1978 | Kirkham | 33/174 |
| 4,153,998 | 5/1979 | McMurtry | 33/174 |
| 4,328,623 | 5/1982 | Juengel et al. | 33/174 |
| 4,334,362 | 6/1982 | Germano et al. | 33/174 |
| 4,339,714 | 7/1982 | Ellis | 33/174 |
| 4,401,945 | 8/1983 | Juengel | 324/207 |
| 4,447,958 | 5/1984 | Tanaka | 33/174 |
| 4,451,987 | 6/1984 | Cusack | 33/174 |
| 4,483,220 | 11/1984 | Shindelar | 81/90 C |

FOREIGN PATENT DOCUMENTS

| | | | |
|---|---|---|---|
| 80653 | 3/1956 | Denmark | 81/176.1 |
| 154608 | 11/1981 | Japan . | |
| 1306068 | 2/1973 | United Kingdom . | |

OTHER PUBLICATIONS

Renishaw Data Sheets MP3; MP1; MP4 and LP2.
Section 3-4.6 of Model 733, Telemetry, Touch Probe (large Machining Center) Instruction Manual, Preliminary, Digital Techniques Service Dept., Valeron Corp.

Primary Examiner—James L. Jones, Jr.
Attorney, Agent, or Firm—Harness, Dickey & Pierce

[57] ABSTRACT

A tool is disclosed for adjusting the tilt of a stylus in a probe. The tool includes a pair of arcuate caliper arms having inwardly directed pins for engaging openings in a pair of beveled washers extending between opposing faces of the probe housing and an adapter. In the disclosed method, the tool is then moved about the circumference of the probe until a given tool portion is generally in line with the direction of the tilt of the stylus. Then, the tool is used to move the pins toward each other to cause relative rotation of the washers to thereby bring the axis of the stylus into a desired orientation.

3 Claims, 10 Drawing Figures

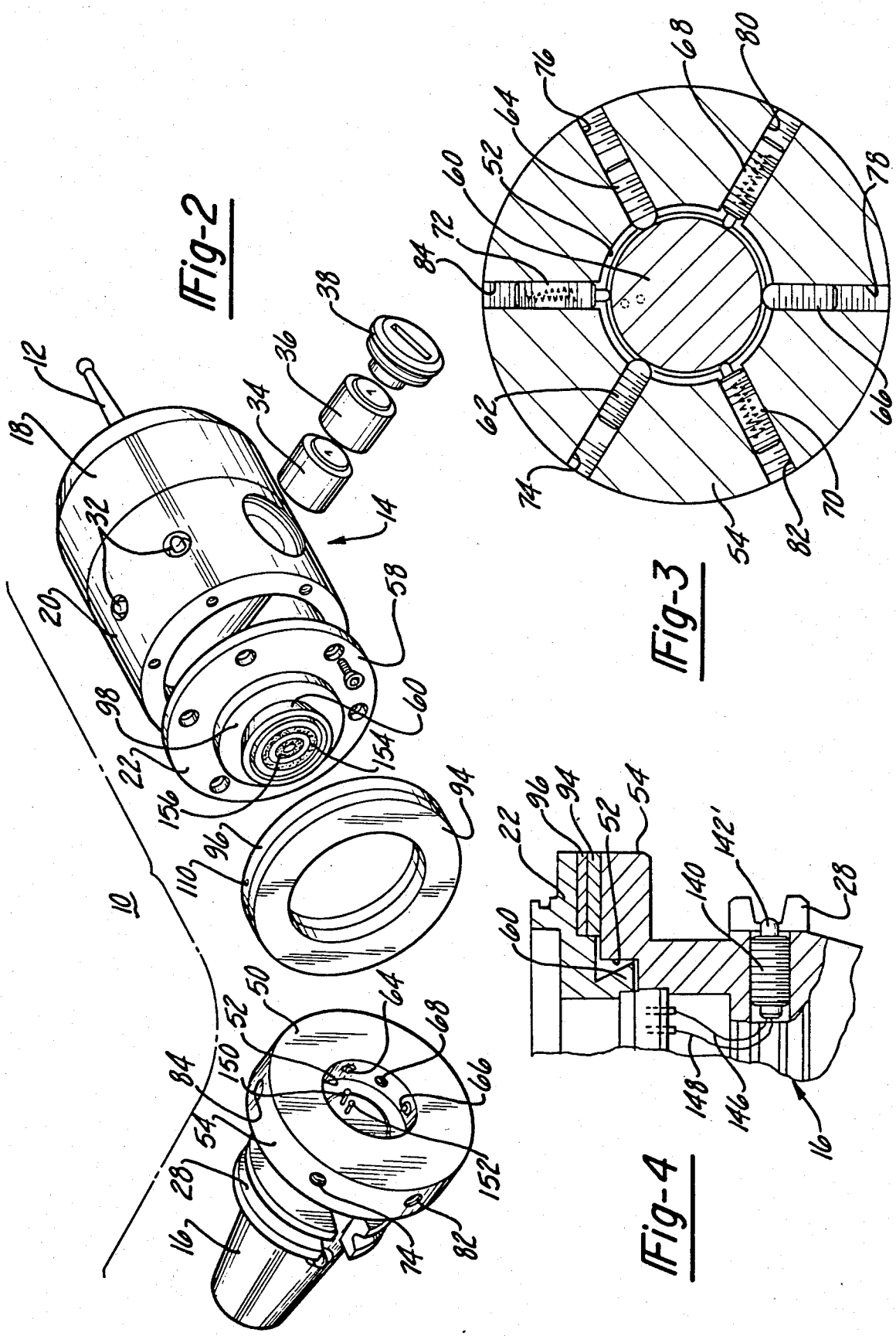

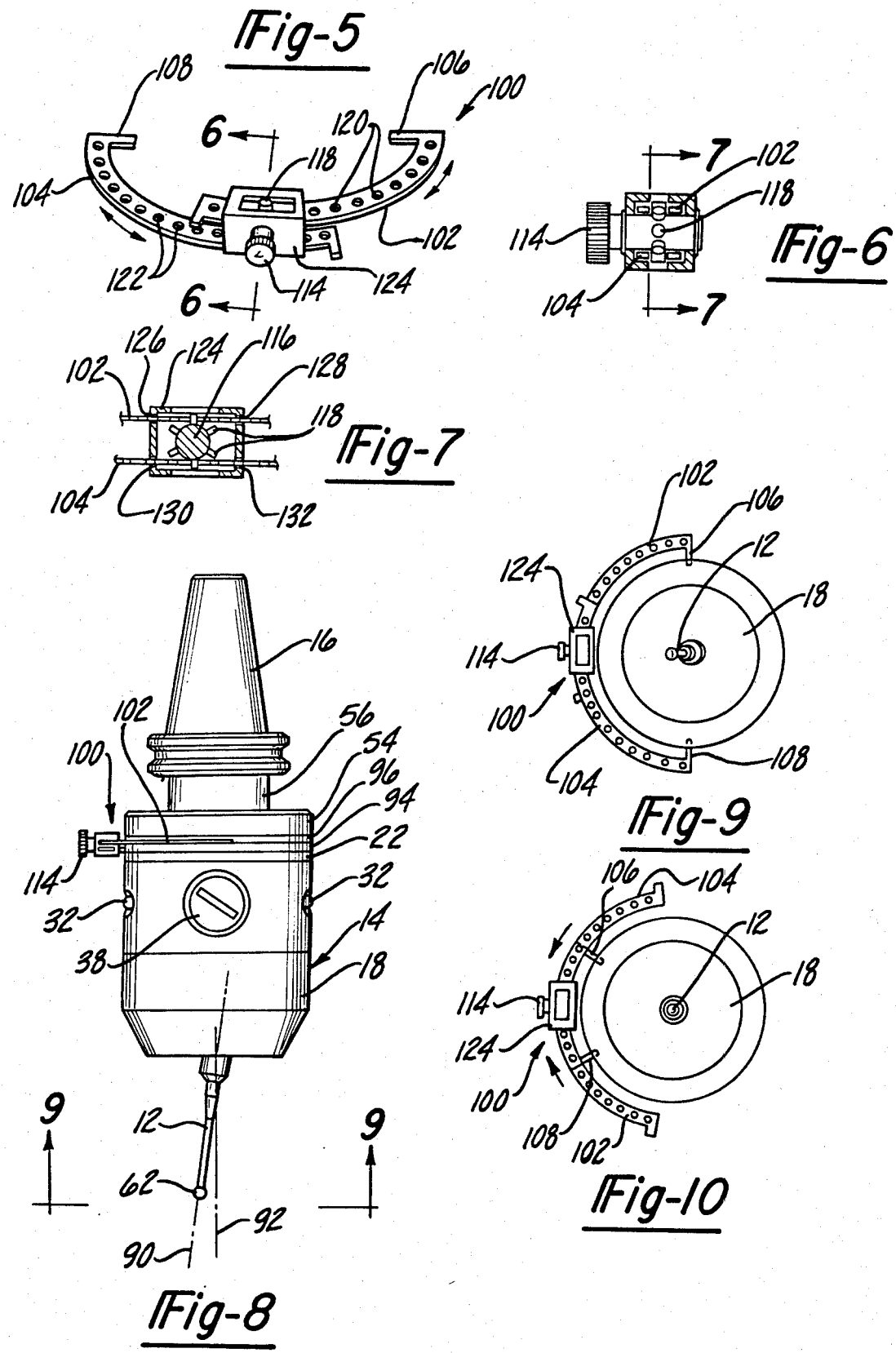

PROBE ADJUSTMENT TOOL AND METHOD OF USING SAME

DESCRIPTION

1. Cross-Reference to Related Application

This is a division of application Ser. No. 504,149, filed June 14, 1983, now U.S. Pat. No. 4,510,693 issued Apr. 16, 1985, which is a continuation-in-part of U.S. Ser. No. 388,187, filed June 14, 1982 entitled "Touch Probe" (now U.S. Pat. No. 4,451,987 and assigned to the assignee of the present invention.

2. Technical Field

This invention relates to workpiece inspection systems and, more particularly, to the use of probes in automated machine tools to contact the workpiece and provide information relating thereto.

3. Background Art

Automated machine tool systems require a precise means of locating surfaces on workpieces. One of the most common methods of accomplishing this task is to have the machine move a probe into contact with the workpiece and to record the probe position when contact is made. Probes of this type are known as touch probes. They generally include a stylus for contacting the workpiece and circuitry which operates to generate an electrical signal when the stylus contacts the part. A machine controller can calculate information about the shape or location of the part from the X, Y and Z axes positional data of the probe when the stylus contact generates the electrical signal. Probes of this general configuration have also been used to perform dimensional gauging operations where the displacement of the stylus is used to provide gauging information.

The patent literature discloses several probe designs which are adapted to be used in automatic machining centers where the probes are temporarily stored in a tool magazine and are connected and removed from the spindle by an automatic tool changer mechanism. Representative examples of this general type are disclosed in U.S. Pat. No. 4,339,714 to Ellis; U.S. Pat. No. 4,118,871 to Kirkham; U.S. Pat. No. 4,328,623 to Juengel et al; U.S. Pat. No. 4,153,998 to McMurtry; and U.S. Ser. No. 259,257 entitled "Apparatus for Detecting the Position of a Probe Relative to a Workpiece", filed Apr. 30, 1981 by Juengel (now U.S. Pat. No. 4,401,945) which is assigned to the assignee of this invention.

In general, the probe assemblies include a main body or housing in which an end thereof opposite the stylus is connected to a suitable adapter. The adapter allows the probe housing to be incorporated into an automated machine tool in the same way as a typical cutting tool. The adapters vary in configuration depending upon the machine tool in which the probe is to be utilized. The adapters can also be configured to enable the probe to be used with a hand or gripping element of an automaton, such as an industrial robot.

It is important that the proper location and orientation of the stylus be provided in order for the probe to generate accurate data. For example, it is often imperative that the tip of the stylus and its associated shaft be precisely centered with the axis of the spindle drive when the probe is used in a machining center. In the past, such precision was attempted to be achieved by maintaining strict tolerances or using special procedures during the construction of the probe. However, such precautions were not always adequate and, in any event, they increased the manufacturing costs of the probe assembly. Known probe constructions (such as the probes sold by Renishaw Electrical Ltd. and the assignee of the present invention) have included provision for centering the tip of the stylus by adjusting the tilt of the probe head which rests on a spherical seat. However, this technique can introduce a corresponding tilt on the stylus shank thereby limiting the usefulness of the probe in some measuring operations.

DISCLOSURE OF THE INVENTION

The general objective of the present invention is to provide a probe assembly with convenient means of adjusting the position of the stylus.

According to the teachings of this invention the probe housing opposite the stylus is provided with a projecting member which is inserted within an opening or well formed in an opposing face of the adapter. The relative dimensions of the well and member are such that the probe housing may be shifted laterally with respect to the major axis of the adapter. Provision is made for contacting the sides of the member and moving the probe housing in the radial direction so as to position the stylus at the desired location. Preferably, the member is frusto-conical in shape with its sides diverging towards the adapter. The adjustment means takes the form of set screws which extend tranversely through the adapter and contact the diverging sides of the member. In such manner, the probe housing is drawn axially towards the adapter and secured thereto in addition to shifting the probe housing radially as defined by the extent of protrusion of the set screws into the well. In the preferred embodiment, three equally spaced set screws are utilized and they are opposed by spring loaded plungers. The plungers serve to prevent accidental separation of the probe housing from the adapter in the event that the set screws are not in operable engagement with the member.

According to another feature of this invention, a pair of beveled washers having non-parallel surfaces are mounted between the probe housing and the adapter. The washers are adapted to be rotated with respect to each other to thereby adjust the tilt of the probe housing and thus adjust the orientation of the stylus axis. Stylus adjustment of this type is made according to the preferred embodiment by including holes in the peripheral surfaces of the washers. A tool having arcuate caliper legs is used to engage the washer holes. Means are provided in the tool for moving the caliper legs about an arcuate path so as to control movement of the washers and bring the stylus axis into proper orientation.

BRIEF DESCRIPTION OF THE DRAWINGS

Still other features and advantages of the present invention will become apparent to one skilled in the art after reading the following specification and by reference to the drawings in which:

FIG. 2 is an exploded perspective view of the probe assembly;

FIG. 3 is a cross-sectional view taken along the lines 3—3 of FIG. 1;

FIG. 4 is a fragmentary cross-sectional view illustrating an alternative location for a proximity switch in the adapter;

FIG. 5 is a perspective view of a tool used to adjust the tilt of the stylus according to one feature of this invention;

FIG. 6 is a cross-sectional view taken along the lines 6—6 of FIG. 5;

FIG. 7 is a partial cross-sectional view taken along the lines 7—7 of FIG. 6;

FIG. 8 is a simplified elevational view of the probe assembly showing the stylus in a tilted orientation;

FIG. 9 is a view taken along the lines 9—9 of FIG. 8; and

FIG. 10 is a view similar to that of FIG. 9 after the stylus has been adjusted.

DESCRIPTION OF THE PREFERRED EMBODIMENT

Figure 1:
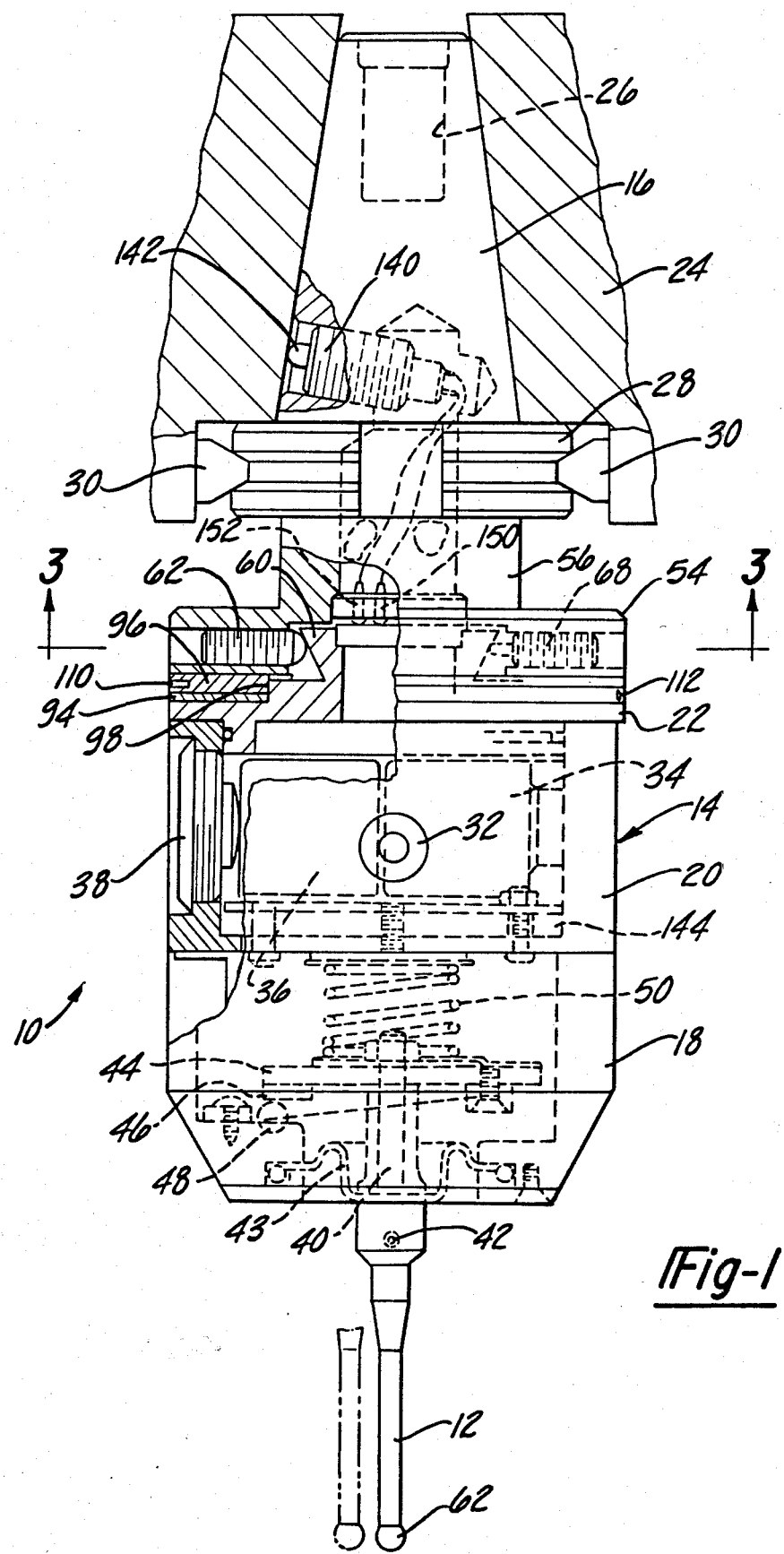
FIG. 1 is a front elevational view with parts in cross-section of a probe assembly made in accordance with the teachings of this invention, the probe assembly being shown mounted in a spindle head of a machining center.

Turning now to FIGS. 1-3 the probe assembly 10 consists generally of three parts: a stylus 12, a probe housing 14 and an adapter 16. The probe housing 14 is more specifically made up of a cylindrical switch unit 18 and a cylindrical circuit unit 20 which are connected together, the end of circuit unit 20 being closed off by a specially formed plate 22 which will be described in detail.

The probe housing 14 is adapted to be detachably connected to a variety of different adapters whose configurations, especially the shanks, are designed to be used with different machine tools. In FIG. 1, the probe assembly 10 is shown mounted in a spindle head 24 of a numerically controlled machining center. The shank of the adapter is tapered and includes a threaded bore 26 therein for receiving a motor driven screw (not shown). The adapter may further include a flange portion 28 with an annular ring for engaging one or more drive keys 30.

The probe housing may include a plurality of light emitting diodes 32 for transmitting information relating to the status of the probe back to a remote receiver head. Probe transmission circuitry within unit 20 receives power from batteries 34, 36 slideably received therein and held in place by cap 38.

The switch unit 18 includes a plurality of contacts mechanically arranged so as to reflect movement of probe stylus 12 resulting from it contacting another object such as a workpiece surface. The mechanical arrangement of this construction is now shown in detail herein, but such arrangements are known to those skilled in the art and are disclosed, for example, in the parent application Ser. No. 388,186 (now U.S. Pat. No. 4,451,987) referred to above. Briefly, the switch unit includes a shaft 40 to which stylus 12 is removable connected as by way of set screw 42. A diaphram 43 seals the interior of the switch unit 18 from adverse environmental conditions. The opposite end of shaft 40 is connected to a follower or wobble plate 44. Wobble plate 44 carries a plurality of conductive inserts 46 which are normally urged against corresponding balls 48 by the action of spring 50. However, when the stylus 12 moves from its rest position the wobble plate 44 follows the stylus motion lifting up one of the inserts 46 from its corresponding ball contact which is fixed. The pairs of ball-switch elements form electrical contact switches whose change in resistance or other electrical characteristics is monitored by the circuitry within unit 20 and transmitted via LED's 32 to the machine controller.

It should be noted that at this point that the description of the probe so far described is merely for purposes of illustrating the environment in which the stylus adjustment features of the present invention may be incorporated.

The reader's attention is particularly drawn towards the area of connection between the probe housing 14 and adapter 16. Adapter 16 includes a generally flat end face 50 having an opening or well 52 formed therein. in this embodiment, the end face 50 is part of an outer annular flange portion 54 of substantial thickness forming a pedestal which is connected to the remainder of adapter 16 through a neck 56.

The end face 58 of probe housing plate 22 includes a member 60 projecting therefrom. Member 60, has a radial dimension that is less than that of adapter well 52. Preferably member 60 has a frusto-conical shape in which the sides thereof diverge towards adapter 16. By way of a specific but non-limiting example, well 52 has a diameter of 1.460 inches, whereas the outermost extremities of member 60 has a diameter of 1.360 inches. Member 60 is adapted to be inserted into well 52 as can be seen most clearly in FIG. 1. Due to the differences in cross-sectional dimension between well 52 and member 60, there is a certain amount of clearance therebetween. This clearance allows for the lateral adjustment of probe stylus 12.

The adapter flange 54 includes radial adjustment devices in the form of three equally spaced set screws 62, 64 and 66 threadably mounted in bores 74, 76 and 78 respectively. The outer ends of screws 62–66 include sockets or other means therein to enable the user to use a tool such as a socket wrench (not shown) to drive the rounded ends of the screws against the sides of member 60.

Assume, for example, that the stylus 12 is in the position shown in phantom lines in FIG. 1 and it is desired to bring the tip 62 thereof into concentric alignment with the major longitudinal axis of adapter 16. It should be understood that the probe is shown out of alignment in an exaggerated manner for purposes of illustrating the operation of the invention. To bring the probe tip 62 into alignment, the operator rotates the appropriate set screws 62–66 to press against the sides of member 60 thereby moving the housing 14 in the radial direction until the tip 62 is at the desired location. The diverging sides of member 60 provide a ramping action when the screws are tightened. Tightening of the screws thus also urge housing 14 in an axial direction towards the adapter 16 to thereby lock the adjusted stylus tip 62 in place.

The adapter flange 54 also advantageously employs a plurality of spring-loaded plungers 68, 70 and 72 which are threadably mounted in bores 80, 82 and 84 respectively. The purpose of plungers 68–72 is to provide sufficient inward force on the sides of member 60 to prevent accidental separation of the probe housing from adapter 16 in the event that the set screws 62–66 do not serve this purpose. For example, if during the alignment process the operator backs-off the set screws the probe housing 14 would otherwise fall from the adapter 16 creating the potential for damage to the sensitive components in the probe housing 14. This is prevented by way of the resilient plunger heads. The plunger heads move outwardly when the member 60 is first inserted into the adapter well 52 but move back inwardly to engage the diverging sides of the member to prevent axial separation.

The foregoing construction provides lateral positioning of the stylus tip 62, i.e. in a direction transverse to the major longitudinal axis of the adapter 16. The following feature of this invention may optionally be incorporated into the probe construction to enable the user to adjust the tilt of the stylus 12. For example, it is generally desirable to bring the axis of the stylus into a concentric relationship with the axis of the adapter thereby centering it with the axis of rotation of the machine tool. In FIG. 8 the axis 90 of stylus 12 is shown in an exaggerated manner tilted with respect to the adapter axis 92. It should be noted that the axis 92 generally corresponds with the major axis of probe housing 14 but that the later may in actuality be shifted somewhat during the lateral adjustment process. It is the alignment of the stylus with the machine spindle head that is important so that some misalignment of the intermediate probe housing 14 can be tolerated.

To adjust the tilt of the stylus axis, a pair of washers 94 and 96 are disposed between the mutually opposing faces of adapter 16 and probe housing 14. Washers 94 and 96 are formed with non-parallel opposing surfaces as perhaps can be best seen in FIGS. 1 and 2. Washers of this type are known in the art as beveled washers. The washers 94 and 96 are piloted about an intermediate hub 98 formed on housing end plate 22. The washers are adapted to rotate circumferentially with respect to each other about hub 98. When the thickest portion of one washer is axially aligned with the thinnest portion of the other washer, the two washers cooperate to provide generally parallel outer surfaces transverse to the elongate axis of the probe assembly 10. When the washers are rotated from this position, however, the outer surfaces become inclined with respect to each other. Since the outer surfaces of washers 94 and 96 define the angular displacement of the probe housing 14 with respect to adapter 16 it is possible to adjust the tilt of the stylus axis 90 since the stylus axis will follow the angular displacement of the probe housing 14 defined by the washers 94, 96.

In FIG. 1 there is no angular displacement created because the washers are oppositely aligned, i.e., thickest portion of one washer being axially aligned with the thinnest portion of the other washer. The axis of the stylus 12 is also shown in FIG. 1 centrally aligned. This may be the situation encountered during initial setup of the probe. However, as shown in FIG. 8 it is possible that the stylus axis 90 be tilted in this situation. Pursuant to this feature of the invention, the stylus tilt can be easily corrected merely by rotating washers 94, 96 with respect to each other to bring the stylus axis at least parallel with the axis 92. Lateral adjustment of the stylus 12, if needed, can be accomplished as described above or in other manners.

A tool 100 is shown in FIGS. 5–10 for rotating the washers and adjusting the stylus tilt. Tool 100 includes a pair of arcuate caliper arms 102 and 104. Each of the arms include inwardly directed pins 106 and 108 for engaging openings 110 and 112, respectively, radially extending outwardly from the thickest portions of washers 96 and 94, respectively. Tool 100 acts in a rack and pinion type manner to move arms 102, 104 simultaneously to cause their respective pins 106, 108 to move in an arcuate path. The tool is constructed so that the distances between each of the pins 106, 108 and a given point on the tool remains in a fixed relationship. In this embodiment, pins 106, 108 always remain the same distance from the axis of knob 114. Knob 114 is connected to a star-gear 116 having teeth 118 radially extending therefrom. Diametrically opposing teeth 118 each engage one of the series of holes 120 and 122 in arms 102 and 104, respectively. The arms are held in spaced relationship by way of a pair of slots formed in opposing sides of gear housing 124. Slots 126 and 128 cooperate to hold arm 102 in a spaced relationship with arm 104 which is guided by way of slots 130 and 132.

In use, the tool 100 is adjusted so that pins 106 and 108 engage the openings 110 and 122 in washers 94, 96. If not already in opposed relationship, knob 114 is rotated until the pins 106 and 108 are generally diametrically opposite one another. Then, the gear housing 124 is rotated circumferentially until the knob 114 is at a location pointed to by the tilted stylus 12 as can be seen most clearly in FIGS. 8 and 9. This procedure provides a reference point for the peak of the stylus tilt since the openings 110 and 112 of the washers are located on the thickest parts thereof. Then, knob 114 is rotated as shown in FIG. 10 to draw the pins 106 and 108 towards the gear housing 124 until such time as the stylus axis is properly aligned. The movement of pins 106 and 108 operate to rotate the beveled washers 94 and 96 to thereby redefine the angular relationship between the outer surfaces of the washers. Non-planearity on the outer washer surfaces cause the probe housing 14 to tilt with respect to adapter 16 and bring the axis 90 of stylus 12 into parallel relationship with axis 92. If the stylus tip 62 does not lie on the desired axis 92, then the user may use the set screws 62–66 to laterally position the stylus as described above. Tightening of the set screws urges the probe housing 14 against the adapter 16 thereby clamping the beveled washers in their adjusted angular positions.

A probe of the type illustrated in these drawings is normally loaded into the spindle head 24 by an automatic tool change mechanism (not shown). The adapter 16 advantageously employs a proximity or limit switch that changes its electrical characteristics when the probe 10 is inserted into the spindle head 24. In FIG. 1, a limit switch 140 includes a plunger 142 that is urged inwardly when the adapter 16 is inserted into the spindle head 24. Alternatively, switch 140' may include a plunger 142' which is pressed in by the drive keys 30 when inserted as shown in FIG. 4. In both embodiments, the output of the switch is connected to circuitry contained within unit 20 of probe housing 14. In FIG. 1 this circuitry is schematically illustrated as being mounted on a circuit board 144. In the preferred embodiment, activation of the switch operates to couple energy from the batteries 34, 36 to the circuitry, which in turn, responds by driving LED's 32 at a given frequency. In such manner, the machine controller (not shown) knows that the probe is operating properly and is ready to perform a probing operation. Once the stylus 12 contacts an object such as a workpiece, the circuitry operates to shift the frequency of the radiation transmitted by LED's 32 to thereby indicate contact.

Electrical connection between switch 140 or 140' and circuitry board 144 is provided by way of wires 146, 148 which are connected to the ends of pin connectors 150 and 152. Pin connectors 150 and 152 have spring-loaded heads which enable them to be yieldable in the axial direction. The heads 150 and 152 are urged against concentric conductive rings 154 and 156, respectively, formed on the end face of member 60 as can be seen most clearly in FIG. 2. Thus, the pins and conductive rings operate to form a separable electrical connection between adapter 16 and probe housing 14. The conductive rings may be connected to suitable locations on circuit board 144 by appropriate means (not shown) such as wires extending through probe housing unit 20.

It should be understood that the foregoing description contains specific examples of various features of this invention which may be used individually if desired but when combined cooperate to provide an extremely versatile probe construction. Various modifications of the specifically illustrated examples will become apparent to those skilled in the art upon a study of the specification, drawings and following claims.

I claim:

1. A tool for use in adjusting a probe assembly including a pair of beveled washers adapted to be rotated with respect to each other to adjust the tilt of a stylus extending from one end of a probe housing, said tool comprising:
   a pair of arcuate caliper arms, each arm having inwardly directed pins for engaging openings in the washers, and manually adjustable means for engaging the arms and simultaneously moving said pins relative to each other to thereby rotate the washers.

2. The tool of claim 1 wherein said arms include a series of holes therein and said means includes a gear having radially projecting teeth, diametrically opposing teeth being operative to engage the holes in each of the arms, and a knob for rotating the gear.

3. A method of adjusting the tilt of the stylus in a probe assembly having a pair of beveled washers extending between opposing faces of a probe housing and an adapter, said method comprising the steps of:
   engaging holes in the thickest peripheral portion of each washer with pins formed on caliper arms of an adjustment tool, said tool including a portion connected to the arms and spaced equidistant from each of the pins;
   moving said tool about the circumference of the probe until the tool portion is generally in line with the direction of the tilt of the stylus; and
   using the tool to move the pins toward each other to cause relative rotation of the washers to thereby bring the axis of the stylus into a desired orientation.

* * * * *